Oct. 1, 1963 A. H. BOBECK 3,105,962

MAGNETIC MEMORY CIRCUITS

Filed April 1, 1960 2 Sheets-Sheet 1

INVENTOR
A. H. BOBECK
BY William H. Kamstra
ATTORNEY

INVENTOR
A. H. BOBECK
BY
William H. Kamstra
ATTORNEY 3,105,962
Patented Oct. 1, 1963

3,105,962

MAGNETIC MEMORY CIRCUITS

Andrew H. Bobeck, Chatham, N.J., assignor to Bell Telephone Laboratories, Incorporated, New York, N.Y., a corporation of New York Filed Apr. 1, 1960, Ser. No. 19,402
22 Claims. (Cl. 340—174)

This invention relates to information storage arrangements and particularly to such arrangements in which information is stored in the form of remanent flux states of magnetic memory elements.

Magnetic information storage arrangements employing magnetic memory elements as information storage addresses are well known in the information handling and processing art. The substantially rectangular hysteresis characteristics of the magnetic materials of which such memory elements are fabricated makes possible the storage of binary information bits in the form of representative stable remanent flux states. The well known toroidal magnetic core, for example, which may be in one remanent flux state representative of the storage therein of a binary "0," is switched to the other remanent state representative of a binary "1" by a suitably applied magnetomotive force. The information content of such a core address is sensed by applying an interrogating magnetomotive force of a polarity such as to drive the core to the "0" remanent state. If, as a result of the applied sensing drive, the core is caused to switch its remanent flux state, a readout voltage induced in a sensing winding coupled to the core signals the storage therein of a binary "1." Should the core already be magnetically remanent in the direction in which the sensing magnetomotive force tends to drive it, that is, have stored therein a binary "0," no flux switching occurs. As a result, no readout signal of the character representative of a binary "1" is induced. Ideally, in conventional practice, a complete absence of a readout signal would be indicative of the storage in the interrogated address of a binary "0." However, the magnetic properties of many magnetic materials from which the core memory elements are fabricated are such that the hysteresis characteristic loop of the material falls short of complete rectangularity. As a result, some flux excursion does take place as the core is driven further into saturation during the interrogation of a binary "0." Since this excursion is in the same direction as that of the flux change upon the interrogation of a binary "1," a small readout signal of the same polarity as the full-valued readout signal indicative of a binary "1" is generated. The small shuttle signals, as they are frequently termed, are generally discriminated between without trouble due to the difference in amplitude by suitable threshold or strobing circuits. However, it may be readily appreciated that the generation of a noise signal when a binary "0" is interrogated represents a departure from the ideal situation where the two binary bits would be distinguished by the presence or complete absence of a readout signal.

The conventional principles of operation of two-state toroidal magnetic core elements described in general terms in the foregoing are well known and have been widely applied in the information handling art. Other core geometries which operate on similar magnetic switching principles are also known. Thus, for example, a memory element in which flux switching is also performed in memory circuit embodiments and which element presents a highly advantageous departure from previous arrangements is described in the copending application of the present inventor, Serial No. 675,522, filed August 1, 1957, now Patent No. 3,083,353 issued March 26, 1963. Uniquely, this memory element in one embodiment offers a continuous magnetic medium for the storage of information bits in the form of an electrically conducting wire having a magnetic flux component helically and coaxially associated therewith. Information bit addresses may be selected and arranged at any points along the length of such a wire memory element. The physical flexibility, extremely small dimensions, and other advantages of such wire memory elements make them ideally suited to novel memory structures and circuits which present greater simplicity, ease of fabrication, and economy of circuit components than was attainable with more conventional core memory elements. The flexibility of the wire memory elements together with the flexibility of the flat strip energizing solenoids which are advantageously employable therewith makes possible, for example, a folded memory construction and circuit such as that described in the copending application of D. G. Clemons, Serial No. 13,960, filed March 9, 1960 now Patent No. 3,084,336 issued April 2, 1963. In the memory as there described the wire memory elements, arranged to form a single memory plane of a multiplane array, are extended, folded, and refolded back on themselves to form a second and succeeding planes of the array.

The storage of individual information bits and their interrogation in the wire memory elements is also based on the remanent magnetic properties of the helical flux components associated therewith. Thus, a remanent magnetization in one direction of an address segment defined on the wire memory element is representative of one binary bit and such a magnetization in the opposite direction is then representative of the other bit. In prior applications of the wire memory elements, the interrogation of stored binary bits in information address segments also generates a full-valued readout signal indicative of a stored binary "1" and a shuttle signal where the complete absence of a readout signal would ideally be indicative of a stored binary "0." The true information readout signals, which advantageously appear across the ends of the wire element itself must thus also be discriminated from shuttle signals in order positively to identify the character of the stored information. In addition, other spurious signals may frequently be generated as the result of the presence of fields caused by currents in other parts of the memory array during writing and interrogation operation. Such unwanted signals, the sources of which may frequently be difficult to determine and therefore also difficult to prevent, may also present problems in large scale magnetic wire memory arrays.

With respect to the structure of wire memory elements it is clear from their continuous nature that the closure of a remanent flux in an information address regment defined thereon will be along an air return path. This is distinguished from more conventional core elements in which the flux is closed substantially entirely within the core structure itself. Since each address segment defined on a wire memory element is separated from an adjacent segment by a suitably determined buffer region, flux closures along a single wire element are completed without interference from such closures of flux of address segments along the same wire element. However, when a plurality of wire elements are arranged in close proximity, competition between information addresses of adjacent memory elements for the available air return paths may result. Since, in order to achieve memories of maximum capacity, it is advantageous to arrange the individual wire memory elements as close together as possible, such competition between address segments tends to place an upper ceiling on the number of information bits which may be stored in a particular memory array.

In view of the foregoing considerations attending the employment of magnetic wire memory elements in magnetic memory arrangements, it is one object of this invention to increase the number of information bits which may be stored in a magnetic wire memory of given physical dimensions.

It is also an object of this invention to improve the discrimination between readout signal conditions representative of binary information bits stored in a magnetic memory array.

Another object of this invention is the cancellation of shuttle signals generated during interrogation of information addresses in a magnetic wire memory array.

Yet another object of this invention is the cancellation of noise signals arising from any source in a magnetic wire memory array.

A further object of this invention is to provide a new and novel magnetic memory array employing magnetic wire memory elements as information storage means.

Still another object of this invention is to provide a new and novel information storage cell capable of storing, by means of a pair of stable magnetic states, either of two binary information bits.

The foregoing and other objects of this invention are realized in one specific illustrative embodiment thereof comprising a plurality of doubled wire memory elements, each of which elements includes a square loop helical flux component axially coincident therewith. Folded portions of each of the memory elements are parallelly arranged with each other and with the folded portions of others of the plurality of elements. A plurality of flat strip solenoids are parallelly arranged transversely to the wire memory elements and in inductive coupling therewith. An XY coordinate array is thus presented in which the strip solenoids constitute the X coordinates and the folded wire memory elements constitute the Y coordinates. At each of the crosspoints of the array an information address is defined comprising a first and a second segment of the doubled wire memory elements. The illustrative memory arrangement being considered is word organized with the strip solenoids defining the words and the doubled wire elements defining corresponding bits of the words.

In accordance with one mode of operating the memory array of this invention, information bits are written into the array by means of coincident currents. In order to write a binary "1," for example, in a selected two-segment information address, a half-select current pulse of one polarity is applied to the strip solenoid partially defining the selected address and a second half-select current pulse of a predetermined polarity is coincidentally applied to the doubled wire element completing the definition of the selected address. Assuming each of the address segments to be magnetized in the same direction before the write operation, the sum of the magnetomotive drives generated by the coincidentally applied half-select pulses switches the remanent flux in one of the segments of the selected information address, the remanent flux in the companion segment remaining in the initial opposite direction. Readout of the "1" bit thus stored is accomplished by applying an interrogating current pulse to the same strip solenoid of sufficient magnitude to switch the remanent flux of the one address segment. A readout signal of a polarity representative of the stored binary "1" bit is generated as a result across the ends of the wire memory element on which the segments of the interrogated address are defined. In this connection it will be appreciated that the companion segment of the interrogated address will be driven further into saturation by the interrogating drive. As a result, a shuttle signal will also be generated. However, because the remanent flux states of the two address segments are of opposite polarities during information storage whereas the polarity of the interrogating drives applied to each segment is the same, this shuttle signal will be of a polarity so as to oppose the information signal simultaneously being generated. Because of the difference in the relative amplitudes of the information and shuttle signals, a sufficiently large information signal remains which is readily detectable by known detector circuits while at the same time the need for discrimination between the two signals is advantageously eliminated.

The handling of a binary "0" in the first mode of operation being generally described in accordance with the principles of this invention is substantially the same as that described for a binary "1." The two binary information bits are distinguished in an information address by a reversal of the magnetic states in the two segments making up an information address. The magnetic states representative of a binary "0" are thus induced in an information address by reversing the polarity of the half-select current pulse applied to the selected doubled wire memory element while the polarity of the half-select pulse applied to the selected solenoid is maintained the same. Readout of the binary "0" is accomplished in a manner identical to that described for the readout of a binary "1" with the exception that a signal of opposite polarity is generated across the ends of the wire memory element carrying the interrogated information address, indicative of the "0." The complete cancellation of the shuttle signal simultaneously being generated is achieved in the same manner as the cancellation of the shuttle signal generated simultaneously with the readout of a binary "1." As a novel result of the doubled memory element arrangement according to this invention, bipolar signals are thus advantageously generated indicative of the two binary information bits while at the same time complete cancellation of shuttle signals is achieved.

In a second mode of operation of the illustrative wire memory array being described, a complete cancellation of shuttle signals is also achieved. However, the readout signal conditions produced indicative of the binary information bits are the conventional presence and absence of an output signal. In the present invention, advantageously the shuttle signals are completely cancelled and the ideal readout signal discrimination mentioned hereinbefore is advantageously achieved. In this mode of operation a binary "1" may be introduced in a manner identical to that described in connection with the first mode of operation. That is, opposite remanent flux states are induced in the two segments making up an information address by the coincident half-select current pulses. Readout is again accomplished by a drive produced by the defining solenoid alone with a readout signal from which the simultaneously generated shuttle signal has been cancelled being indicative of the stored binary "1." In an formation address is which a binary "0" is to be stored, the magnetic flux states of the address segments are left in the condition which obtains after a prior interrogation. Thus, during write-in, no current pulse is applied to the doubled wire memory element carrying the information address in which a binary "0" is to be stored. Both of the segments of the address are thus left in the same magnetic flux state to which they were driven by the prior interrogation drive. As a result, during a subsequent interrogation only a shuttle flux excursion takes place in both of the segments of the interrogated information address. Because of the doubled memory element construction of this invention, shuttle signals of opposite polarity will be generated during the interrogation of a binary "0." These shuttle signals will accordingly be effectively cancelled with the result that a complete absence of a readout signal during an interrogation phase of operation is advantageously achieved, which condition is indicative of a binary "0."

The novel doubled wire memory element construction according to the principles of this invention permits still another advantageous mode of operation in which the writing of information bits of a word is accomplished by single half-select write current pulses applied to the doubled wire memory elements alone. In this mode, the write operation is performed immediately following a readout of a selected word. Word selection for the write operation in this mode is determined by the preceding readout so that the write-in is accomplished only in the word row which was previously read out. The half-select write current pulses in this mode need only be of a magnitude sufficient to cause a partial flux excursion in an address segment. Thus, in addition to eliminating the necessity of providing coinciding currents for application to a word solenoid and attendant timing circuits, a substantial saving in power requirements is achieved. In this mode of operation a write current pulse of one polarity is applied to a doubled wire memory element in which a "1" is to be stored of a magnitude sufficient only to to drive one of the address segments partially to opposite saturation. Although a complete flux reversal does not occur as a result of the applied current pulse, a new remanent point is reached on a minor hysteresis loop from which the flux is switched during interrogation. A readout signal indicative of the stored "1" is generated as a result together with a shuttle signal as previously described. The latter signal will again be of opposite polarity so that an effective cancellation is achieved. To write a binary "0" the polarity of the write current pulse applied to the doubled wire memory element is reversed to alternate the address segments in which the partial flux reversal is induced. A readout signal of opposite polarity is accordingly generated during interrogation, which signal is thus indicative of a stored binary "0." The shuttle signal also generated is again cancelled as was the case with the interrogation of a binary "1."

A wire memory array in accordance with the principles of this inventon, operated in any of the foregoing modes, may thus be advantageously utilized in a wide range of information handling systems. The memory array of this invention may be operated, for example, in conjunction with associated rewrite circuitry well known in the art capable of rewriting the same or different information bits in a word row after each interrogation.

In accordance with the various aspects of this invention features thereof include an information storage cell comprising a first and a second segment of the same wire memory element, which latter element is doubled back on itself such that an energizing solenoid is inductively coupled to the segments in opposing senses. Remanent fluxes of opposite polarity with respect to the energizing solenoid may thus be established in the two segments by means of half-select current pulses in the doubled wire memory element and the energizing solenoid. An interrogating current pulse in the energizing solenoid alone subsequently switches the flux in one segment and drives it further into saturation in the companion segment. The polarity of the signals generated during such interrogation distinguishes between the information values which are represented by the bipolar remanent fluxes.

It is another feature of this invention that doubled individual wire memory elements of a magnetic wire memory array are arranged in close proximity such that information address segments defined on the doubled portions of the wire elements share flux air return paths for remanent flux induced therein.

It is still another feature of this invention that the length of information address segments defined on the wire memory elements of a wire memory array are determined as approaching the minimum length for obtaining stability of magnetizations induced therein. As a result, selective write-in is advantageously made possible using only single half-select write current pulses rather than the coincident current techniques generally necessitated in prior art arrangements.

It is also a feature of this invention that individual wire memory elements are so arranged in a wire memory array that stray magnetic fields act on different portions of the same wire memory element in opposite directions. A substantial cancellation of noise signals generated by such fields is thus achieved.

The foregoing and other objects and features of this invention may be better understood from a consideration of a detailed description of one illustrative embodiment thereof which follows when taken in conjunction with the accompanying drawing in which.

Figure 1:
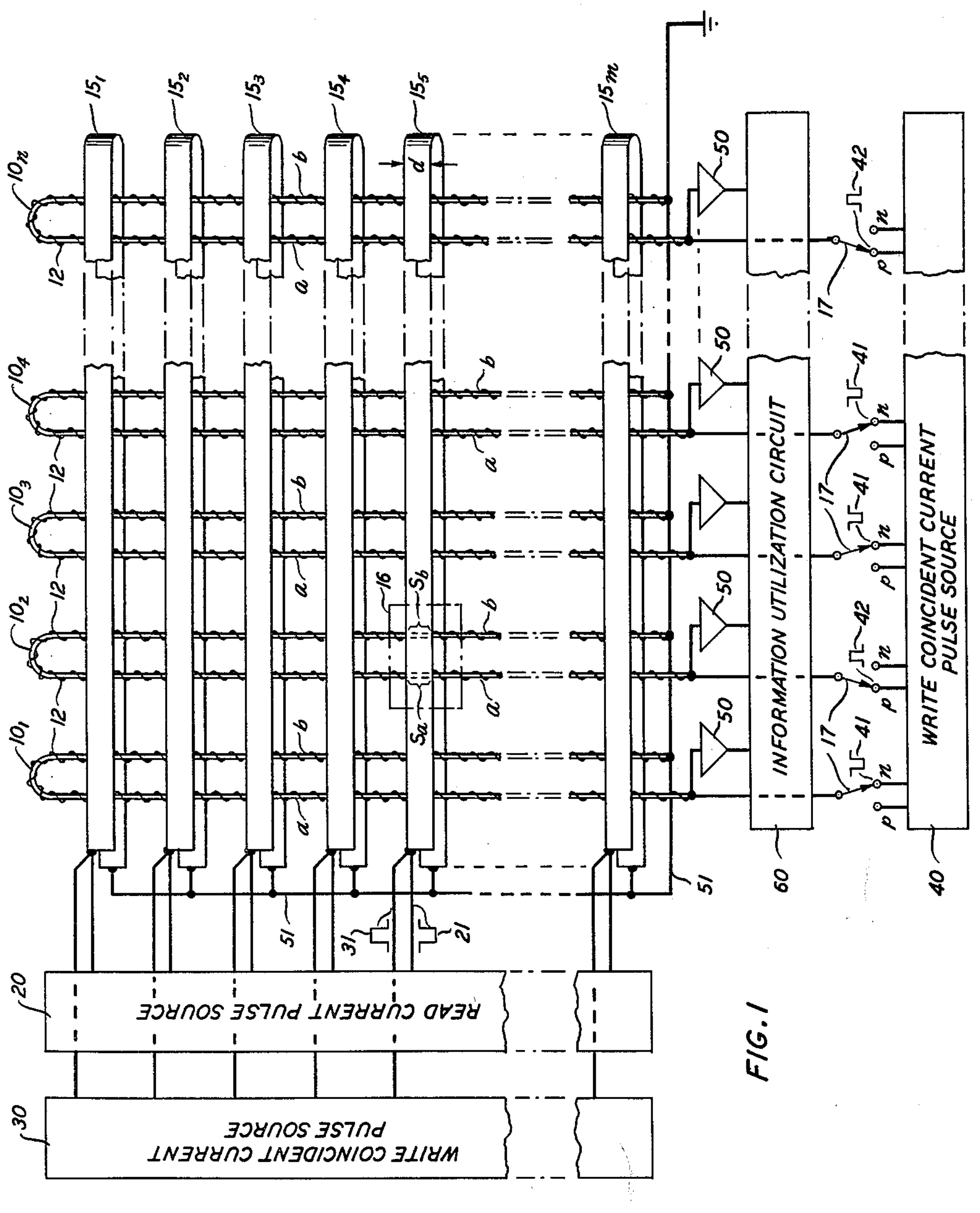
FIG. 1 shows a coordinate wire memory array according to the principles of this invention.

The specific embodiment of this invention depicted in FIG. 1, comprises a plurality of wire memory elements $10_1$ through $10_n$ each of which is doubled back on itself to present a portion *a* and a portion *b*. The elements 10, the portions *a* and *b* of which are parallelly arranged, may each advantageously comprise wire memory elements of the character described in the copending application of the present inventor previously referred to herein. Thus, the wire elements 10, selected to illustrate the principles of the present invention, each comprises an electrical conductor about which is helically wound a magnetic tape 12 of a material exhibiting substantially rectangular hysteresis characteristics. The magnetio tape 12 thus comprises the flux switching component of a memory element 10 and is coaxially and helically associated therewith. A plurality of conductor means, which advantageously take the form of flat strip solenoids $15_1$ through $15_m$, are transversely arranged into inductive coupling with both of the portions *a* and *b* of the wire memory elements 10. The solenoids 15 are also parallelly arranged and form the X coordinates of an XY coordinate array of which the portions *a* and *b* of the wire elements 10 form the Y coordinates. The solenoids 15, which are arranged to encircle the doubled memory elements 10, define on the latter elements 10 a coordinate array of information addresses. Each of the information addresses such as, for example, the exemplary information address 16 outlined in FIG. 1, comprises a first and a companion information address segment S*a* and S*b* defined on the portions *a* and *b*, respectively, of a wire memory element 10.

Each of the solenoids 15 is connected at one end to a read current pulse source 20 and to a write coincident current pulse source 30. The latter source is unnecessary in one of the modes of operation possible with the present invention as will be described in detail hereinafter. The portions *a* of each of the wire elements 10 are connected to a second write coincident current pulse source 40 via a switch wiper 17. The wipers 17 each has two contact positions *p* and *n* connected to positive and negative outputs respectively, of pulse source 40. In addition, the portions *a* of the wire elements 10 are each connected to an amplifying means 50. Outputs from the amplifying means 50 are taken for supplying signals of a character to be described to information utilization circuits 60. The portions *b* of each of the wire elements 10 and the other ends of the solenoids 15 are each connected to a ground bus 51. The sources 20, 30, and 40 may each comprise current pulse sources capable of selectively generating current pulses of a polarity and magnitude to be more specifically described hereinafter. Since such sources comprise well-known elements of the present invention which are readily devisable by one skilled in the art, they are shown only in block symbol form and need not be described in further detail. The sources 30 and 40 are timed, in one mode of operation of this invention, to produce coincident half-select current pulses by control arrangements not shown in the drawing, which arrangements comprise associated components of the system of which the present invention advantageously may constitute a part. Similarly, the amplifying means 50 may comprise circuits well known to one skilled in the art adapted to perform the detecting and amplifying functions preparatory to the transmission of information readout signals to the utilization circuits 60. The latter circuits may also comprise associated components of the system of which the present invention may constitute a part.

With the foregoing organization of one illustrative embodiment of this invention in mind, a representative operation thereof in the first of the modes previously mentioned may now be described. In this connection the write-in and interrogation of an exemplary information word in the word row defined by the word solenoid $15_5$ will be considered. It will further be assumed that the exemplary word consists of the binary bits 0, 1, 0, 0, . . . 1. As the result of a previous interrogation the information address segments *Sa* and *Sb* of each of the wire memory elements $10_1$ through $10_n$ containing the addresses of the word row under consideration, are in a magnetic state which may be understood as being downward as viewed in the drawing. It will be appreciated that the magnetization of each of the segments will in fact follow a helical downward direction in view of the helical direction of the flux components in which magnetizations are induced. In order to write an information bit which is to be represented by opposite directions of remanent flux in a pair of address segments comprising an information address, it is clear from the flux states existing after an interrogation that the remanent flux of only one of the address segments need be switched. This is advantageously accomplished by coincident half-select current pulses of a suitable polarity and magnitude selectively supplied by the current pulse sources 30 and 40. To write either of the two binary bits into an address, a positive half-select current pulse 31 is applied to the selected word solenoid, in the present case being described, the word solenoid $15_5$. Coincidentally with the current pulse 31, half-select current pulses are applied to the doubled wire memory elements 10 from the current pulse source 40 in accordance with the binary bits to be written into the bit addresses of the selected word. Thus, in the present case, a negative half-select current pulse 41 is applied to each of the wire memory elements $10_1$, $10_3$, and $10_4$. At the same time a positive half-select current pulse 42 is applied to each of the wire memory elements $10_2$ and $10_n$. The pulses 41 and 42 are obtained from the double outputs of the current source 40 by setting the switch wipers 17 to the proper contact *p* or *n*. The mechanical means for obtaining the bipolar current pulses 41 and 42 are shown only for purposes of description. In the actual practice of this invention electronic switching means of a character well known in the art, controlled by information input circuits would be more conveniently employed. The half-select pulses 31, 41, and 42 are each of a magnitude sufficient to provide at least half of the magnetomotive force necessary to cause a complete flux switching in an address segment of the information address in which an information bit is to be written. The effect of the applied coincident half-select write current pulses may be further understood with reference to FIG. 2 of the drawing.

Figure 2:
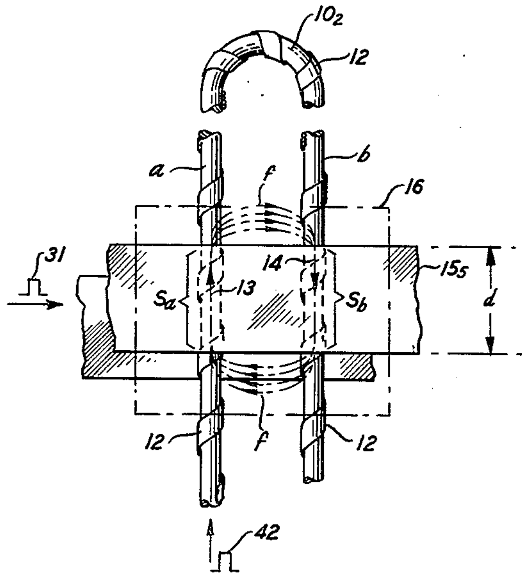
FIG. 2 is a fragmentary view of one information address of the memory array of FIG. 1.

A fragment of the wire memory element $10_2$ and the solenoid $15_5$ defining the address 16 made up of the segments *Sa* and *Sb* are shown in FIG. 2. As a result of the combined fields applied to the address segment *Sa* by the positive coincident half-select current pulses 31 and 42 described above, the downward magnetization of the latter segment is caused to switch to what may be understood as the upward direction as viewed in the drawing. This new magnetic state of the segment *Sa* and its direction is represented in FIG. 2 by the arrow 13.

The current pulse 42 in the portion *b* of the wire element $10_2$ develops a field which acts in a direction opposite to that in which it is effective in the portion *a* of the same element. Resultants of the fields produced by the half-select current pulses 31 and 42 effectively cancel with respect to the address segment *Sb* with the result that the total drive on the latter segment is zero and the flux state obtaining after the previous interrogation remains undisturbed. The latter state and its direction are represented in FIG. 2 by the arrow 14. Conditions of opposite remanent flux have thus been established in the address segments *Sa* and *Sb* of the information address 16, which conditions in this embodiment are determined as representative of a binary "1." The same sequence of flux states are established in the information address segments defined on the wire memory element $10_n$ by the solenoid $15_5$ by application of half-select current pulses 31 and 42, respectively, to the latter elements.

The binary "0's" are written in the desired information addresses by applying a negative half-select write current pulse 41 to the wire memory elements $10_1$, $10_3$, and $10_4$, also coincidentally with the half-select current pulse 31 being applied to the word solenoid $15_5$. In this case the fields produced by the latter current pulses cause a flux switching in the address segments *Sb* of the defined information addresses, while resultants of the generated fields cancel with respect to the address segments *Sa* of the latter addresses. As a result, the downward magnetizations in the latter segments established as a consequence of the previous interrogation operation are left undisturbed. Remanent flux states are thus induced in the information addresses which are to store binary "0's" of polarities opposite to those of the information addresses storing binary "1's." The exemplary information word assumed for purposes of description has thus been written into the selected word row defined by the solenoid $15_5$ and the latter row is now prepared for a subsequent interrogation phase of operation. The writing operation with respect to the other word rows defined by the solenoids $15_1$, $15_2$, $15_3$, $15_4$, and $15_m$ is performed in a manner similar to that described in the foregoing. A half-select positive write current pulse is applied to the selected word solenoid from the source 30 coincidentally with half-select write current pulses of a polarity which corresponds with the information bits to be stored to the memory elements 10 from the source 40.

Before proceeding to a detailed description of the interrogation of the exemplary word the introduction of which was described above, it is convenient at this point to consider the aspect of this invention which makes possible the advantageous close spacing of individual wire memory elements. Reference to the fragmentary view of FIG. 2 makes clear the closure paths of the remanent fluxes induced in the adjacent segments *Sa* and *Sb* of the information address 16 there depicted. Since the latter fluxes are oppositely directed in the case of either of the binary bits, the return paths will be closed as demonstrated by the flux lines *f*. Thus, during the operation of this invention in which information is actually being stored, no situation will exist in which there is a competition for the available air return paths between adjacent address segments. In connection with the storage of either binary bit, the remanent flux in one address segment is closed via an air return path and links with the flux in the companion address segment. This advantageous arrangement may be distinguished from prior art wire memory arrays in which a series of the same binary information bits may necessitate remanent magnetizations of the same polarity in adjacent single address segments of individual wire elements during the information storage time. In the latter case the flux will manifestly be unable to close through adjacent segments, and sufficient spacing must be insured to provide adequate return paths for the information bearing flux of the address segments. It may be noted that a situation does occur in the operation of the present invention in which each of the companion address segments of the information addresses in fact is magnetized in the same direction with a consequent competition for available flux air return paths between the segments. As pointed out in the foregoing, during each interrogation the address segments are driven to the same direction of magnetic saturation as a result of which oppositely directed return paths between the address segments are required. However, this is the "clear" state of a word row during which no information is being stored and the competition for the air return paths at this time presents no problems.

Figure 3:
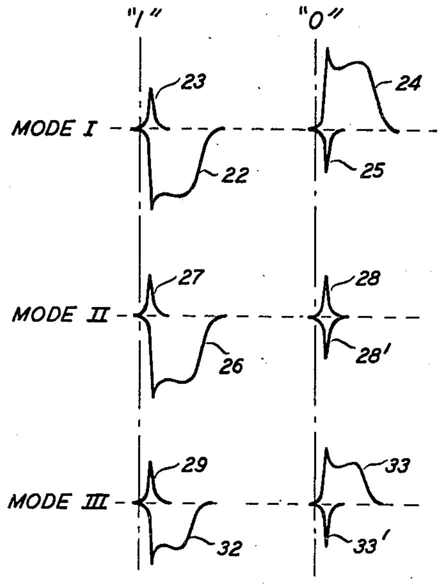
FIG. 3 shows a comparison of readout signals in idealized form representing the two binary information bits in various modes of operation of this invention.

When the binary information stored in the exemplary word row defined by the solenoid $15_5$ is interrogated, the latter solenoid alone is energized. A negative read current pulse 21 is selectively applied to the solenoid $15_5$ from the read current pulse source 20. The pulse 21 is of a magnitude sufficient to switch the remanent flux state in any of the address segments where the direction of the flux permits. Such a flux switching will occur in each of the information addresses being interrogated since the remanent flux in one of the address segments of an address will be in a direction to respond to the interrogating drive. Thus, for example, the interrogation of the information address 16 shown in FIG. 2 in which a binary "1" is stored, will cause a flux switching in the address segment *Sa*. As a result, a negative readout signal will be generated across the address segment *Sa* indicative of the stored binary "1." This signal is shown in idealized form in FIG. 3 as the signal 22. The interrogating drive applied to the address segment *Sb* of the information address 16 of FIG. 2 causes the latter segment to be driven further into magnetic saturation. The small flux excursion, which is in the same direction with respect to the direction of the interrogating drive as the flux switching in the segment *Sa*, induces a shuttle signal across the address segment *Sb*. However, in view of the doubled arrangement of the element $10_2$, the shuttle flux excursion in the segment *Sb* is in a direction opposite to that of the flux switching in the segment *Sa* with respect to the direction in which readout signals are induced in the wire element $10_2$. Accordingly, the induced shuttle signal will be of opposite polarity to that of the readout signal 22. The shuttle signal, depicted as the signal 23 in FIG. 3, is thus subtracted from the readout signal 22 as is clear from the drawing. A resultant of the signals 22 and 23 which will be negative in direction will thus be generated across the end of the wire memory element $10_2$ and applied to the inputs of the amplifying means 50 connected to the wire memory elements $10_2$ and $10_n$. The resultant signals are there amplified and transmitted to the information utilization circuits 60.

The foregoing interrogation of an information address containing a binary "1" is repeated at the information addresses containing binary "0's." In the latter cases, however, since the interrogating drive will be effective to switch the remanent flux of the address segments opposite to those in which the flux is switched during the interrogation of a binary "1," the polarities of the information and shuttle signals will be reversed. The relationships and polarities of the latter signals are shown in FIG. 3 as the signals 24 and 25, respectively. Since a readout signal is generated responsive to the interrogation of both an information address in which a binary "1" and a binary "0" is stored, it is evident that the shuttle signals simultaneously generated in each case present no problems of discrimination or possibility of confusion.

The present invention is also operable in a manner such that the presence and complete absence of a readout signal are the conditions indicative of the storage in an interrogated information address of a binary "1" and "0," respectively. In this mode of operation, in order to write in an information word in a selected word row, half-select current pulses of one polarity are applied only to the wire memory elements having defined thereon the information address segments of the addresses which are to store the binary "1's" during the write-in operation. During the latter operation, no current pulses at all are applied to the wire memory elements carrying the information addresses in which binary "0's" are to be stored. Coincident write magnetomotive drives are as a result effective only to cause a flux switching in address segments which are to contain the "1's." The switching operation in the latter case is identical to that described for the storage of a binary "1" in the first mode of operation described above with reference to FIG. 2. In those information addresses in which binary "0's" are to be stored, the result of the write current pulse applied to the selected word solenoid alone is to leave the flux states of the companion address segments effectively in the states existing immediately after a previous interrogation. Accordingly, these flux states may be understood as being in a downward direction as viewed in the drawing as described hereinbefore.

During the interrogation of a selected word row in the second mode of operation, the flux switching in an information address containing a binary "1" generates a readout signal such as the signal 26 shown in FIG. 3 together with a shuttle signal such as the signal 27. Since the latter signals are of opposite polarity and occur simultaneously, discrimination problems are again avoided. In the information addresses in which binary "0's" are stored, since the flux states of the companion address segments are already in the state to which the interrogating current pulse tends to drive them, only shuttle flux excursions will occur. The signals generated across the ends of the wire memory elements on which the interrogated addresses storing binary "0's" are defined will be of opposite polarity due to the doubled arrangement of the memory elements. Shuttle signals conventionally indicative of a binary "0" are thus effectively cancelled as is depicted by the signals 28 and 28' in FIG. 3.

In a third mode of operation, the writing of information in a selected word row is accomplished after an interrogation of the selected word row by applying half-select write current pulses of proper polarity to the wire memory elements 10 alone. In this case the source 30, which provides coincident word select write current pulses in other modes of operation is not required. In order to achieve the third mode of operation, the dimension *d* of each of the word solenoids 15 is maintained so as to define address segments of a particular critical length. The critical segment length is determined such that the segment approaches the minimum length at which magnetic stability still is achieved. In this connection it may be recalled that when a small segment of a flux component of a relatively long wire memory element is magnetized, the remanent flux must find a return via an air path. The reluctance of this air path, which, as was seen in the foregoing, is also controlled by the spacing of adjacent segments, places a restriction on the segment length which may be permanently remanently magnetized. Thus, a segment is subjected to demagnetizing fields which increase proportionately as the length of the segment is decreased, and if this length is too small, the magnetization of a segment will be unstable once the switching field is removed. A particular segment length in a given case may be closely estimated by adjusting the length so that the demagnetizing fields on the magnetized region equal the coercive field. The minimum stable length of a wire segment will also be controlled by the particular ferromagnetic material employed for the fabrication of the wire memory elements.

The dimension *d* of the solenoids 15 is accordingly adjusted on the basis of the foregoing considerations. With the length of the address segments thus adjusted to approach instability, the advantageous close spacing of the wire memory elements in accordance with the principles of the present invention is further exploited to achieve a further marginal stability in the magnetic states of the address segments. Thus, after each interrogation, the address segments of the addresses of a selected word row will be magnetized downward as previously stated. It will be recalled that at this time when no information is being stored in the interrogated word row, a competition between the flux air return paths between the segments in fact exists. As a result, the hysteresis characteristic loop of the segments at this point assumes a "sheared" appearance which may be depicted by the idealized loop 70 shown in FIG. 4.

Figure 4:
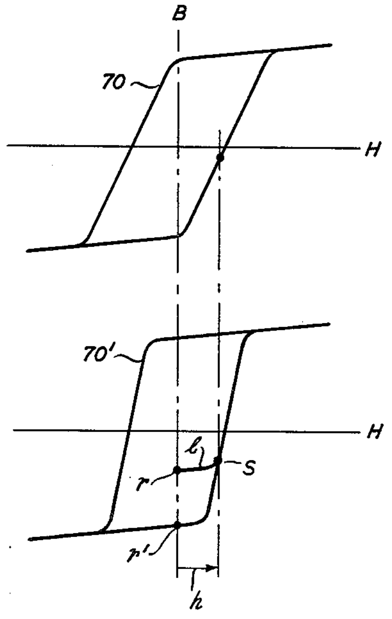
FIG. 4 shows a comparison of idealized hysteresis loops of the magnetic flux components of the wire memory elements of this invention in one mode of operation.

In the third mode of operating the present invention, flux states in the address segments of the information addresses representative of the two binary bits, may accord with those states as previously described in connection with the first mode of operation. Thus, readout signals of opposite polarity indicative of the binary bits stored may be obtained indicative of a binary "1" and "0," respectively. When a single half-select negative or positive current pulse 41 or 42 is applied to the wire memory element 10 having thereon an information address in which flux switching is to be caused in accordance with a particular binary bit to be written, the flux in one of the address segments of the information address will begin to switch. Since both of the segments are in the interrogated flux state as a result of a previous readout, each has a hysteresis loop such as the loop 70 of FIG. 4, in which the "knees" of the loop are close to the B axis. As there depicted, it may be seen that only a small drive in the H direction will cause the driven segment to begin to switch its flux. As the flux switching begins, more of the flux closure is linked with the flux in the companion segment, with the result that a change to greater rectangularity takes place in the loop 70. At the termination of the half-select write current pulse, flux switching determined by the drive generated by the latter pulse, which drive is depicted as $h$ in FIG. 4, will have been caused in the driven segment which switching will be less than a complete excursion into opposite saturation. In this connection it may be assumed that the half-select write current pulse is positive and corresponds to the pulse 42 of FIG. 2. Thus, as depicted in FIG. 4, the switching address segment may be driven to the point $s$ indicated on the loop 70', from which point $s$ the segment returns to a remanent point $r$ along the minor loop $l$. Since more of the switching flux is returnable through the flux in the companion address segment, the loop 70', although not completely rectangular, denotes sufficient stability to accomplish the storage of a binary bit by means of a remanent flux state. The applied half-select current pulse causes only a shuttle excursion during write-in in the companion address segment, which latter segment thus remains magnetically undisturbed from the interrogated flux state. The latter remanent state is represented on the loop 70' of FIG. 4 by the point $r'$.

The different remanent points thus established may be utilized to achieve bipolar readout signals indicative of the stored binary bits such as were described in connection with first mode of operation. Thus, to store a binary "0" the polarity of the half-select write current pulse applied to a memory element 10 alone is reversed. A write pulse corresponding to a pulse 41 of FIG. 1 may thus be applied. When an information address containing a binary "1" is interrogated in the manner already described hereinbefore, the segment S$b$ will be driven from the point $r'$ of the loop 70' further into saturation and a shuttle signal will be generated. This shuttle signal is depicted in FIG. 3 as the signal 29. The segment S$a$, which is at the point $r$ of the loop 70' for the storage of a binary "1," will be driven from the latter point to saturation in the same direction. As a result, a larger readout signal of opposite polarity is generated across the address segment S$a$. The latter signal is depicted in FIG. 3 as the signal 32. The resultant of the signals 29 and 32 appearing across the ends of the wire memory element containing the interrogated address, although of lesser magnitude than the corresponding information signals 22 and 26 indicative of a binary "1" generated in other modes of operation of this invention, is still sufficient to provide positive discrimination between the presence and absence of readout signals indicative of the binary bits.

When a binary "0" is interrogated in accordance with the third mode of operation, the readout signals are reversed in polarity as represented by the signals 33 and 33' in FIG. 3. This is also in accord with the readout signals generated in the first mode of operation previously described. It will be appreciated that by employing bipolar magnetic states to represent the two binary information bits, the writing of information in one word row will not disturb information already written into other word rows. This may be seen from the loop 70' of FIG. 4, where it is clear that a force $h$ generated by a half-select write current pulse in the opposite direction will be insufficient to drive an address segment into opposite saturation from its remanent point $r$.

The advantageous doubled arrangement of the wire memory elements according to the principles of this invention also achieves a substantial cancellation of noise signals. These noise signals may be generated as the result of stray magnetic fields produced incidental to the presence of currents in various parts of the memory array during write-in or interrogation operations. The noise signals of one polarity generated by such fields acting on a portion $a$, for example, of a wire memory element, will be substantially cancelled by the corresponding noise signals of the opposite polarity generated by the same fields acting on the portion $b$ of the same wire memory element. The close spacing of the two portions $a$ and $b$ of a wire memory element 10 insures that an external field acting on one of the portions will act with substantially the same total inductive effect on the other portion.

What has been described is considered to be only one specific illustrative embodiment of this invention. Accordingly, it is to be understood that various and numerous other arrangements may be devised by one skilled in the art without departing from the spirit and scope of this invention. It is further to be understood that the dimensions and physical relationships of the illustrative embodiment described have been exaggerated in the drawing for purposes of clarity.

What is claimed is:

1. A magnetic memory circuit comprising a plurality of wire memory elements each comprising an electrical conductor having a flux component axially coincident therewith, said flux component having a substantially rectangular hysteresis characteristic, a plurality of energizing conductor means each being inductively coupled to a first and a second segment of each of said plurality of wire memory elements, means for applying a first write current pulse of one polarity to a selected one of said conductor means, said first current pulse generating a magnetic field operative in one direction in a first segment of each of said wire elements and in the opposite direction in a second segment of each of said wire elements, and means for applying second write current pulses of one polarity to particular ones of said wire memory elements and second write current pulses of the opposite polarity to others of said wire memory elements coincidentally with said first write current pulse to induce remanent flux states of particular alternating directions in said first and said second segments representative of binary information values.

2. A magnetic memory circuit as claimed in claim 1 also comprising means for applying a read current pulse of a polarity opposite to that of said first write current pulse to said selected one of said conductor means, and means for detecting readout signals generated across the ends of said wire memory elements.

3. A magnetic memory circuit as claimed in claim 2 in which each of said wire memory elements is folded so as to present a first portion having said first segment thereon and a second portion having said second segment thereon.

4. In a magnetic memory array, the combination comprising a wire memory element comprising an electrical conductor having a flux component axially coincident therewith, said flux component having a substantially rectangular hysteresis characteristic, said wire memory element being doubled to present a first portion extending in one direction and a second portion extending in the opposite direction, a plurality of energizing conductor means inductively coupled to said doubled wire memory element and defining a plurality of information bit addresses on said doubled wire memory element, each of said bit addresses comprising a first segment of said first portion and a second segment of said second portion of said wire memory element, means for applying a first write current pulse of one polarity to one of said conductor means defining a selected information bit address, means for applying a second write current pulse of one polarity to said wire memory element coincidentally with said first write current pulse to induce remanent flux states of a first and a second polarity in the first and second segments, respectively, of said selected information address representative of one binary bit, means for applying a read current pulse of a polarity opposite to the polarity of said first write current pulse to said one of said conductor means, and means for detecting readout signals generated across the ends of said wire memory elements.

5. In a magnetic memory array, the combination as claimed in claim 4 also comprising means for applying a second write current pulse of the opposite polarity to said wire memory element coincidentally with said first write current pulse to induce remanent flux states of said second and said first polarity in said first and second segments, respectively, of said selected information address representative of the other binary bit.

6. A magnetic memory circuit comprising a plurality of pairs of wire memory elements each comprising an electrical conductor having a flux component axially coincident therewith, said flux component having a substantially rectangular hysteresis characteristic, a plurality of circuit means for completing a circuit in one direction through a first element of each of said pairs of memory elements and in the opposite direction through the other element of each of said pairs of memory elements, a plurality of conductor means transversely arranged in inductive coupling with said plurality of memory elements, each of said conductor means defining a word row of information addresses on said plurality of memory elements, each of said information addresses comprising a first and a second address segment on said wire memory element pairs, means for selectively applying a first current pulse of one polarity to one of said plurality of conductor means defining a selected word row, and means for selectively applying second current pulses of one and the opposite polarity to said pairs of wire memory elements coincidentally with said first current pulse to induce remanent flux states of a first and a second polarity in the address segments of first information addresses of said selected word row representative of first binary information bits and remanent flux states of said second and said first polarity in the address segments of other information addresses of said selected word row representative of second binary information bits.

7. A magnetic memory circuit as claimed in claim 6 also comprising interrogation means comprising means for selectively applying read current pulses of a polarity opposite to that of said first current pulse to said plurality of conductor means for switching the remanent flux states of the address segments of the information addresses of selected word rows to the same direction, and means for detecting flux switching in either direction in said wire memory elements.

8. A magnetic memory circuit comprising a first and a second continuous magnetic medium having substantially rectangular hysteresis characteristics, an energizing conductor means inductively coupled to said first and said second magnetic mediums and defining a first and a second address segment thereon, means including said energizing conductor means for applying current pulses in opposite directions to said first and second magnetic mediums to induce a remanent flux in a first direction in said first address segment and in the opposite direction in said second address segment representative of a first binary information bit and a remanent flux in said opposite direction in said first address segment and in said first direction in said second address segment representative of a second binary information bit, said first and said second magnetic mediums being so spaced that a remanent flux in one direction in one of said address segments is linked to a remanent flux in the opposite direction in the other of said address segments, means including said energizing conductor means for switching the remanent flux states of said first and said second address segments to the same direction, and means for detecting flux switching in either direction in said first and said second magnetic mediums.

9. A magnetic memory circuit comprising a first and a second continuous magnetic medium having substantially rectangular hysteresis characteristics, an energizing conductor means inductively coupled to said first and said second magnetic mediums and defining a first and a second address segment thereon, interrogating means for applying a read current pulse to said energizing conductor means for generating a drive field thereon in the same direction with respect to said first and said second address segments to achieve remanent flux states in the same direction in said last-mentioned segments representative of a clear information state, and write means for switching the remanent flux state of one of said address segments to a polarity opposite to that of the other address segment representative of a particular binary information bit, said first and said second magnetic mediums being spaced so that a remanent flux in one direction in one of said segments is linked to a remanent flux in the opposite direction in the other of said address segments.

10. A magnetic memory circuit as claimed in claim 9 in which said write means comprises means for applying a first half-select write current pulse of one polarity to said energizing conductor means, electrical conducting means serially coupled to said first and said second magnetic mediums, and means for applying a second half-select write current pulse of a particular polarity to said electrical conducting means coincidentally with said first half-select write current pulse.

11. A magnetic memory circuit as claimed in claim 9 also comprising means connected to said electrical conducting means for detecting flux switching in said first and said second magnetic mediums.

12. A magnetic memory circuit as claimed in claim 11 in which said electrical conducting means comprises a wire conductor folded to present a first and a second portion and said first and said second continuous magnetic mediums each comprise a magnetic member helically wound around one of said portions of said wire conductor.

13. A magnetic memory circuit comprising a plurality of pairs of parallelly arranged wire memory elements each comprising an electrical conductor having a flux component helically and axially coincident therewith, each of said flux components having substantially rectangular hysteresis characteristics, circuit means for connecting together the same end of the electrical conductors of each of said pairs of elements, an input terminal at the other end of one of the electrical conductors of each of said pairs of elements, a plurality of energizing conductor means parallelly arranged in inductive coupling with each element of said pairs of memory elements and defining a coordinate array of first and second address segments on said pairs of memory elements, means including a pulse source for applying a first half-select write current pulse of one polarity to a selected energizing conductor, means including a second pulse source for applying a second half-select write current pulse of one polarity to an input terminal of a particular one of the electrical conductors of said pairs of memory elements to induce remanent flux states of one and the opposite polarity in a selected first and second address segment, respectively, representative of one binary information bit, means including a pulse source for applying a read current pulse of a polarity opposite to that of said first write current pulse to said selected energizing conductor to switch the remanent flux state of one of said selected address segments, and means connected to said input terminals for detecting flux switching in said pairs of wire memory elements.

14. A magnetic memory circuit as claimed in claim 13 also comprising means including a pulse source for applying a second half-select write current pulse of the opposite polarity to an input terminal of another of the electrical conductors of said pairs of memory elements to induce remanent flux states of said opposite polarity and said one polarity in another selected first and second address segment, respectively, representative of the other binary bit.

15. A magnetic memory circuit comprising a first and a second wire memory element each comprising an electrical conductor having a magnetic flux component helically and axially coincident therewith, segments of said magnetic flux components having two stable flux states, circuit means for connecting the same ends of said electrical conductors of said first and second wire memory elements, an energizing conductor means inductively coupled to and defining a first and a second one of said segments on said first and second wire memory element, respectively, said energizing conductor means being inductively associated with said first and second segment such that an axial field around said conductor means is inductively operative in the same direction with respect to both of said segments, means including said energizing conductor for inducing remanent flux states in one direction in each of said first and second segments representative of a clear information condition, and means for applying a current pulse to the other end of one electrical conductor of said first and second wire memory elements of a magnitude sufficient to cause at least a partial flux switching in the opposite direction in one of said first and second segments representative of a particular binary information bit.

16. A magnetic memory circuit comprising a first and a second wire memory element arranged in a spaced apart relationship, each comprising an electrical conductor having a magnetic flux component helicaly and axially coincident therewith, circuit means for connecting the same ends of the electrical conductors of said first and second wire memory elements, solenoid means inductively coupled to said first and second wire memory elements, said solenoid means being inductively associated with a first and a second segment of said flux components respectively such that an axial field around said solenoid means is inductively operative in the same direction with respect to both of said segments, means including said solenoid means for inducing flux states in a first direction in said first and said second segment of said flux components representative of a clear information condition, said first and second segments being magnetically stable beyond a minimum segment length as determined by the spacing of said first and second wire memory elements and the dimensions of said solenoid means, and means for applying a current pulse to the other end of one electrical conductor of said first and second wire memory elements of a magnitude sufficient to cause at least a partial flux switching toward the flux state in the opposite direction in one of said first and second segments representative of a particular binary information bit.

17. A magnetic memory circuit as claimed in claim 16 also comprising means connected to the other end of one electrical conductor of said first and second wire memory elements for detecting readout signals generated across said first and second wire memory elements when the flux in said one of said first and second segments is subsequently restored to said flux state in said first direction.

18. A magnetic memory circuit comprising a plurality of pairs of parallelly arranged wire memory elements each comprising an electrical conductor having a magnetic flux component helically and axially coincident therewith, segments of said magnetic flux components having two stable flux states, circuit means for connecting the same end of the electrical conductors of the wire elements of each of said pairs of elements, a plurality of energizing conductor means parallelly arranged in inductive coupling with each element of said pairs of memory elements and defining a coordinate array of first and second ones of said segments on said pairs of memory elements, means including a selected one of said energizing conductors for inducing remanent flux states in a first direction in each segment of a selected group of said first and second segments representative of a clear information condition, and means for applying write current pulses of one polarity to the other ends of particular electrical conductors of said pairs of wire memory elements of a magnitude sufficient to cause at least a partial flux switching toward the flux state in the opposite direction in particular first segments of said selected group of first and second segments representative of first binary information bits.

19. A magnetic memory circuit as claimed in claim 18 also comprising means for applying write current pulses of the opposite polarity to the other ends of other electrical conductors of said pairs of wire memory elements of a magnitude sufficient to cause at least a partial flux switching toward the flux state in the opposite direction in particular second segments of said selected group of first and second segments representative of other binary information bits.

20. A magnetic circuit as claimed in claim 18 also comprising a plurality of output circuit means connected respectively to the other ends of corresponding single electrical conductors of said pairs of wire memory elements for detecting readout signals generated across said pairs of memory elements when the flux in said particular first segments is subsequently restored in said flux state in said first direction.

21. An information storage circuit comprising an electrical conducting wire having a magnetic tape helically wound therearound, said tape having substantially rectangular hysteresis characteristics, said wire being folded to present a first and a second portion thereof, an energizing conductor means inductively coupled to said first and said second portions of said wire and defining a first and a second information address segment thereon, respectively, means for applying a first half-select current pulse of one polarity to said energizing conductor means, means for applying a second half-select current pulse of one polarity to the first portion of said wire coincidentally with said first current pulse to induce a remanent flux state in one direction in said first address segment and a remanent flux state in the opposite direction in said second address segment representative of one binary information bit, means for subsequently applying a read current pulse of a polarity opposite to the polarity of said first half-select current pulse to said energizing conductor means to drive said first and said second address segments to the same remanent flux states, and means for detecting readout signals generated in said wire by flux changes in said magnetic tape.

22. An information storage circuit as claimed in claim 21 also comprising means for applying a second half-select current pulse of the opposite polarity to the first portion of said wire coincidentally with said first current pulse to induce a remanent flux state in said one direction in said second address segment and a remanent flux state in said opposite direction in said first address segment representative of the other binary information bit.

References Cited in the file of this patent

UNITED STATES PATENTS

| | | |
|---|---|---|
| 2,768,367 | Rajchman | Oct. 23, 1956 |
| 2,809,367 | Stuart-Williams | Oct. 8, 1957 |
| 2,846,668 | Dunlap | Aug. 5, 1958 |
| 2,882,517 | Warren | Apr. 14, 1959 |